United States Patent
Boinais et al.

(10) Patent No.: US 12,162,388 B2
(45) Date of Patent: Dec. 10, 2024

(54) METHOD AND APPARATUS FOR FORMING A SEAT COMPONENT

(71) Applicant: FAURECIA AUTOMOTIVE SEATING, LLC, Auburn Hills, MI (US)

(72) Inventors: Olivier Boinais, West Bloomfield, MI (US); Aurelien Francois, Berkley, MI (US); Aaron Snyder, Wauwatosa, WI (US)

(73) Assignee: FAURECIA AUTOMOTIVE SEATING, LLC, Auburn Hills, MI (US)

( * ) Notice: Subject to any disclaimer, the term of this patent is extended or adjusted under 35 U.S.C. 154(b) by 241 days.

(21) Appl. No.: 17/879,022

(22) Filed: Aug. 2, 2022

(65) Prior Publication Data
US 2024/0042909 A1    Feb. 8, 2024

(51) Int. Cl.
*B60N 2/68* (2006.01)
*B60N 2/58* (2006.01)

(52) U.S. Cl.
CPC .......... *B60N 2/686* (2013.01); *B60N 2/5825* (2013.01); *B60N 2/68* (2013.01); *B60N 2/682* (2013.01)

(58) Field of Classification Search
CPC ......... B60N 2/68; B60N 2/686; B60N 2/7041
USPC .................. 297/452.15, 452.55, 452.14
See application file for complete search history.

(56) References Cited

U.S. PATENT DOCUMENTS

| | | | | |
|---|---|---|---|---|
| 3,751,845 | A * | 8/1973 | van Leeuwen | A01K 97/05 D22/136 |
| 4,189,180 | A * | 2/1980 | Klein | A47C 7/74 297/452.45 |
| 8,794,708 | B2 * | 8/2014 | Besnard | B29C 44/367 29/91.5 |
| 9,849,817 | B2 | 12/2017 | Line et al. | |
| 10,081,281 | B2 * | 9/2018 | Römer | B60N 2/42709 |
| 10,118,523 | B2 | 11/2018 | Song et al. | |
| 11,084,405 | B2 * | 8/2021 | Onuma | B60N 2/682 |
| 2010/0052398 | A1 * | 3/2010 | Hanusiak | A47C 9/10 297/451.4 |
| 2016/0023583 | A1 * | 1/2016 | Yasuda | B60N 2/80 297/391 |
| 2018/0111531 | A1 * | 4/2018 | Sasaki | B60N 2/686 |
| 2018/0178692 | A1 * | 6/2018 | Zhao | B60N 2/5657 |
| 2018/0291003 | A1 | 10/2018 | Schleth et al. | |
| 2020/0247356 | A1 * | 8/2020 | Hoernke | B60N 2/42 |
| 2021/0016519 | A1 | 1/2021 | Garrett | |
| 2021/0086670 | A1 * | 3/2021 | Kozlowski | B32B 27/304 |

(Continued)

FOREIGN PATENT DOCUMENTS

CN    106867106 A    6/2017
CN    211107074 U    7/2020

(Continued)

*Primary Examiner* — Timothy J Brindley
(74) *Attorney, Agent, or Firm* — Barnes & Thornburg LLP

(57) ABSTRACT

A seat component assembly includes a structural body comprised of a natural fiber polypropylene material and an additional seat component attached to the structural body to provide a seat back or a seat cushion. A method of forming a seat component assembly includes forming a structural body comprised of a natural fiber polypropylene material and attaching an additional seat component to the structural body to provide a seat back or a seat cushion.

2 Claims, 2 Drawing Sheets

(56) References Cited

U.S. PATENT DOCUMENTS

| | | | |
|---|---|---|---|
| 2021/0188038 A1* | 6/2021 | Tait | B60H 1/00564 |
| 2021/0221266 A1 | 7/2021 | Kozlowski et al. | |
| 2022/0227273 A1* | 7/2022 | Francois | B60N 2/7017 |

FOREIGN PATENT DOCUMENTS

| | | | | |
|---|---|---|---|---|
| CN | 114364572 B | * | 4/2024 | B60N 2/68 |
| DE | 10226380 A1 | | 12/2002 | |
| DE | 202007000484 U1 | | 5/2008 | |
| DE | 202008015401 U1 | * | 5/2010 | B60N 2/68 |
| DE | 102013205559 A1 | * | 10/2013 | B60N 2/4221 |
| DE | 202017105014 U1 | | 10/2017 | |
| DE | 102017215092 A1 | * | 2/2019 | |
| DE | 202021105805 U1 | * | 1/2022 | B60N 2/2213 |
| EP | 3992026 A1 | * | 5/2022 | B60N 2/643 |
| FR | 3037846 A1 | | 12/2016 | |
| FR | 3037847 A1 | | 12/2016 | |
| FR | 3100766 A1 | | 3/2021 | |
| JP | H0570343 U | * | 9/1993 | |
| JP | 2004016710 A | * | 1/2004 | |
| JP | 6432981 B2 | | 12/2018 | |
| KR | 20180097192 A | * | 8/2018 | |
| WO | WO-2020135994 A1 | * | 7/2020 | B29B 13/022 |
| WO | WO-2021005141 A1 | * | 1/2021 | B60N 2/68 |
| WO | WO-2023154463 A1 | * | 8/2023 | |
| WO | WO-2023223808 A1 | * | 11/2023 | |

* cited by examiner

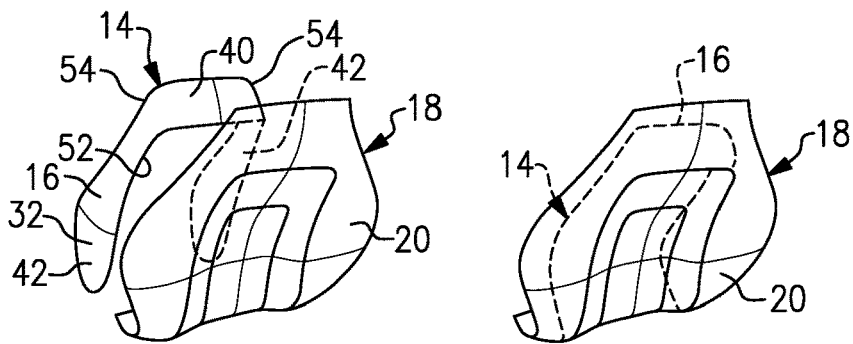
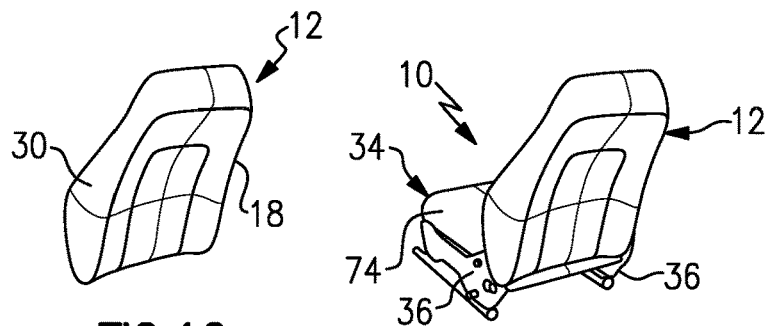
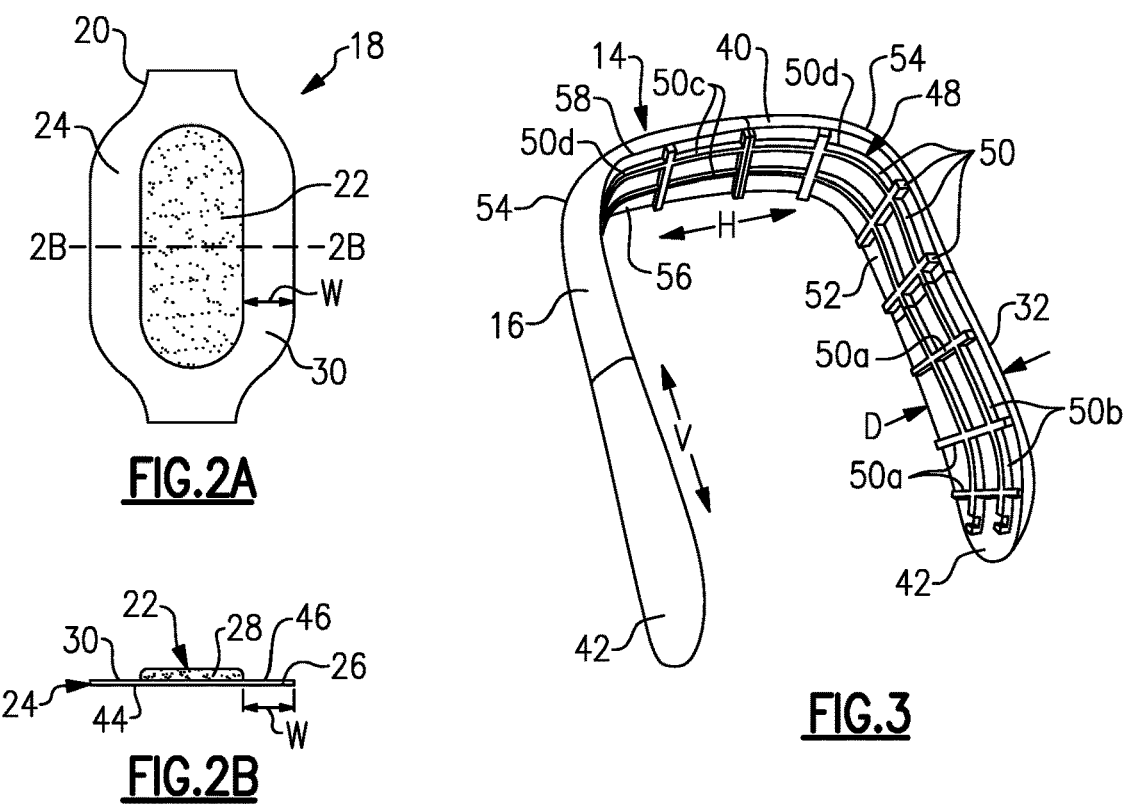

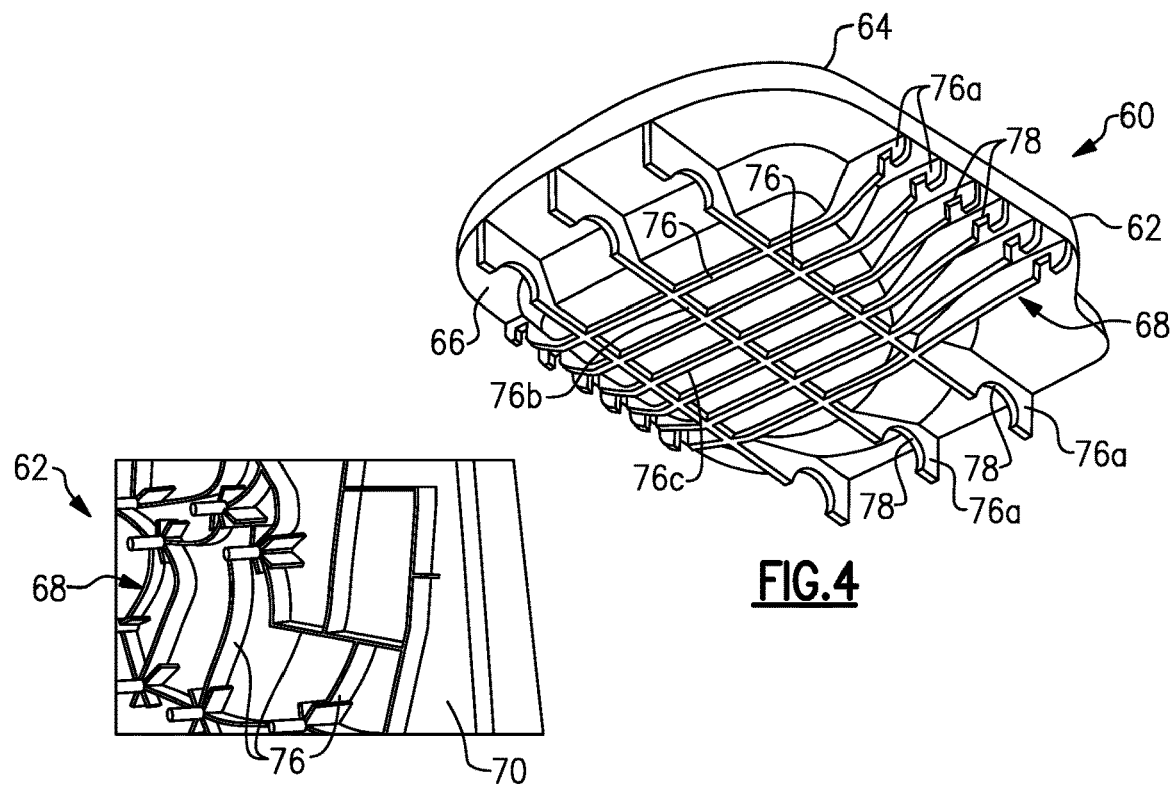
FIG.4
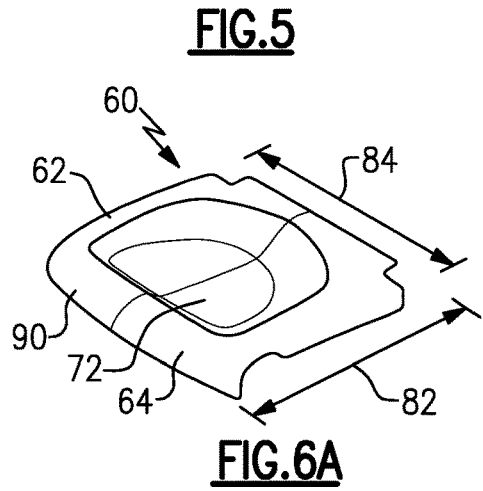
FIG.5
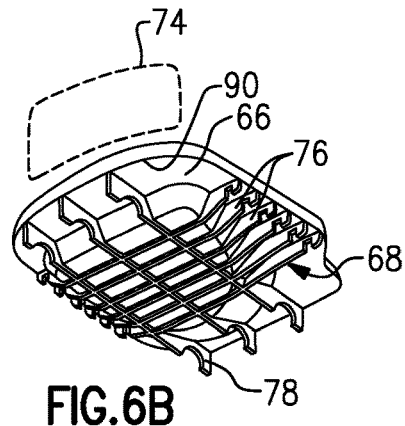
FIG.6A
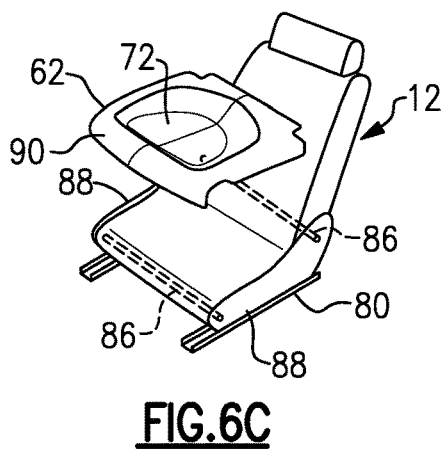
FIG.6B
FIG.6C
FIG.6D

METHOD AND APPARATUS FOR FORMING A SEAT COMPONENT

TECHNICAL FIELD

The subject disclosure generally relates to a seat component assembly that comprises a structural body comprised of a natural fiber polypropylene material.

BACKGROUND OF THE INVENTION

Manufacturing a seat back or seat cushion for a vehicle seat assembly can be energy intensive and time consuming as multiple steps are often required. Additionally, traditional materials used for structural support within the seat back or seat cushion can be heavier than necessary and labor intensive to work with.

SUMMARY OF THE INVENTION

In one exemplary embodiment, a seat component assembly includes a structural body comprised of a natural fiber polypropylene material and an additional seat component attached to the structural body to provide a seat back or a seat cushion.

In another embodiment according to the previous embodiment, the structural body comprises a seat back frame, and wherein the additional seat component comprises a back panel comprised of a foam layer and a cover material.

In another embodiment according to any of the previous embodiments, the cover material includes a perimeter portion that is free from foam material, and wherein the perimeter portion of the cover material is wrapped around an outwardly facing surface of the seat back frame.

In another embodiment according to any of the previous embodiments, the back panel comprises a cover carving back panel, and wherein the cover carving back panel and seat back frame are bonded directly together to form a finished seat back.

In another embodiment according to any of the previous embodiments, the seat back frame comprises a compression mat formed into a perimeter structure having a U-shape.

In another embodiment according to any of the previous embodiments, a ribbed component is associated with the seat back frame to increase rigidity, wherein the ribbed component comprises a plurality of structural ribs that are formed on an inwardly facing surface of the seat back frame.

In another embodiment according to any of the previous embodiments, the structural body comprises a seat pan having a first surface facing in an upward direction and a second surface facing opposite the first surface, and wherein the additional seat component comprises a ribbed structure attached to the second surface to provide structural support for the seat cushion.

In another embodiment according to any of the previous embodiments, the seat pan comprises a compression mat that includes a recessed area on the first surface to support a cushioning material to provide a finished seat cushion.

In another embodiment according to any of the previous embodiments, the ribbed structure comprises a plurality of structural ribs that are spaced apart from each other and extend across the second surface, and wherein at least some of the plurality of the structural ribs include hooked recesses to interface with a seat frame.

In another embodiment according to any of the previous embodiments, the seat pan includes a nose that is supported by metal seat frame.

In another embodiment according to any of the previous embodiments, a ribbed component is associated with the structural body to increase rigidity, and wherein the structural body comprises a seat back frame formed as a compression mat, and wherein the additional seat component comprises a cover carving back panel comprised of a foam layer and a cover material to provide the seat back, or wherein the structural body comprises a seat pan formed as a compression mat and having a first surface facing in an upward direction and a second surface facing opposite the first surface, and wherein the additional seat component comprises a ribbed structure attached to the second surface to provide structural support for the seat cushion. In one exemplary embodiment, a method comprises the steps of forming a structural body comprised of a natural fiber polypropylene material; and attaching an additional seat component to the structural body to provide a seat back or a seat cushion.

In another embodiment a method includes the steps of: forming a structural body comprised of a natural fiber polypropylene material; and attaching an additional seat component to the structural body to provide a seat back or a seat cushion.

In another embodiment according to any of the previous embodiments, the method includes the steps of forming the structural body as a compression mat, and wherein the structural body comprises: a seat back frame, and wherein the additional seat component comprises a back panel comprised of a foam layer and a cover material, and including attaching the back panel to the seat back frame to provide the seat back, or a seat pan having a first surface facing in an upward direction and a second surface facing opposite the first surface, and wherein the additional seat component comprises a ribbed structure attached to the second surface to provide structural support for the seat cushion.

In another embodiment according to any of the previous embodiments, the structural body comprises the seat back frame, and the method includes spraying the foam layer onto a layer of the cover material such that a perimeter portion of the cover material is free from the foam layer, and pressing the foam layer and covering material layer to form the back panel as a cover carving back panel, wrapping the perimeter portion of the layer of cover material around sides of the seat back frame, and attaching the cover carving back panel to the seat back frame to form the seat back.

In another embodiment according to any of the previous embodiments, the structural body comprises the seat pan, and including molding the ribbed component to the second side of the seat pan, forming a recessed area on the first side of the seat pan to support a cushioning material, forming at least some ribs of the ribbed component to include hooked recesses, and hooking the hooked recesses onto a seat frame that supports the seat pan.

These and other features may be best understood from the following drawings and specification.

BRIEF DESCRIPTION OF THE DRAWINGS

The various features and advantages of the disclosed examples will become apparent to those skilled in the art from the detailed description. The figures that accompany the detailed description can be briefly described as follows:

FIG. 1A is a perspective view of a seat back frame and seat back panel prior to assembly.

FIG. 1B is a view similar to FIG. 1A but showing the seat back frame and seat back panel aligned with each other.

FIG. 1C shows a perimeter of the seat back panel wrapped around outwardly facing surfaces of the seat back frame to form a seat back.

FIG. 1D shows the seat back attached to a seat cushion to provide a seat.

FIG. 2A is a schematic representation of the seat back panel having a perimeter free from foam material.

FIG. 2B is a section view of the seat back panel of FIG. 2A.

FIG. 3 is another example of a seat back frame to be used in a seat such as that shown in FIG. 1D.

FIG. 4 shows a perspective view of a seat pan according to the present disclosure.

FIG. 5 shows a compressed mat of NFPP material with injection molded ribs that is used to form the seat pan of FIG. 4.

FIG. 6A shows a perspective top view of the compressed mat of FIG. 5.

FIG. 6B shows a perspective bottom view of the compressed mat with injection molded ribs.

FIG. 6C shows the seat pan being aligned with a seat bottom frame structure.

FIG. 6D shows the seat pan attached to the seat bottom frame structure to provide a seat.

DETAILED DESCRIPTION

The subject disclosure generally relates to a seat component assembly that comprises a structural body comprised of a natural fiber polypropylene material. An additional seat component is attached to the structural body to provide a seat back or a seat cushion for a vehicle seat assembly.

FIGS. 1A-1D disclose steps for making a seat back 12 for a vehicle seat assembly 10. In one example, the seat back 12 comprises a structural body 14 that is comprised of a natural fiber polypropylene material (NFPP). NFPP products comprising high natural fiber-reinforced composites have a greater recyclable content and bring added functionality. The structural body 14 made from NFPP is shaped by compression molding to form a compression mat and can include up to 50% natural fibers. The use of NFPP decreases the weight and $CO_2$ emissions by half as compared to similar seat components made from all plastic materials.

In one example shown in FIG. 1A, the structural body 14 comprises a seat back frame 16. An additional component is attached to the seat back frame 16 to provide a finished seat back 12. In one example, the additional seat component comprises a back panel 18. In one example, the back panel 18 comprises a cover carving back panel 20 comprised of a foam layer and a cover material. Cover Carving Technology (CCT) combines polyurethane foam spraying with molding to create a sculpted cover for seat surfaces. In one example, the foam is sprayed onto fabric, vinyl, leather, etc., which is then placed in a press and cut to a desired shape of the part. Thus, CCT is based on the direct compression of polyurethane onto fabric, vinyl or leather to produce complex shapes in a very repeatable and durable manner. The manufacturing process has a less expensive tooling cost versus processes used to make a traditional plastic back panel. Additionally, the process provides for complex concave and convex shapes. Another benefit is that the back panel 18 can be attached directly onto the seat frame, which allows for a very flexible application.

FIGS. 2A-2B are schematic representations of a seat back panel 18 made from a covering material layer and a foam layer. In one example, the seat back panel 18 is formed from CCT. FIG. 2A shows an initial configuration of the back panel 18 where a foam material 22 has been sprayed onto a cover material 24. As shown in FIG. 2B, the cover material 24 provides an outermost layer 26 that forms an exterior surface of the seat back 12, and the foam material provides an innermost layer 28 that provides a cushioning effect for the seat back 12. In one example, the cover material 24 includes a perimeter portion 30 that is free from having any foam material 22. The foam-free perimeter portion 30 of the cover material 24 is a significant area and can have a width W of several inches around the entire perimeter of the back panel 18. The width of the foam-free perimeter portion 30 can vary about the perimeter and will vary from seat back to seat back depending on the type of vehicle seat. The width W of the perimeter portion 30 should be sufficient such that the cover material 24 of the perimeter portion can be wrapped around an outwardly facing surface 32 of the seat back frame 16. The cover carving back panel 18 and the seat back frame 16 are bonded directly together to form the finished seat back 12. No additional steps are needed to provide the final seat back 12.

In one example, the back panel 18 and the seat back frame 16 are bonded together either mechanically using fasteners for example, or are chemically bonded together using glue, for example. Other attachment methods could also be used.

The seat back 12 can then be attached to a seat cushion 34 (FIG. 1D) to provide the finished vehicle seat assembly 10. The seat back 12 is typically attached to side support structures 36 such that the seat back 12 can be pivoted relative to the seat cushion 34 between a plurality of positions. The side support structures 36 are fixed to a vehicle floor and/or frame.

In one example, the seat back frame 16 is made from the NFPP material, which is shaped by compression molding to form a compression mat. The compression mat comprises a semi-rigid structure that holds its shape yet provides for some flexibility. In one example, the seat back frame 16 comprises a compression mat formed into a perimeter structure having a U-shape. The U-shape comprises a base 40 forming an upper portion of the seat back 12 and a pair of legs 42 extending downwardly from opposing sides of the base 40 toward the seat cushion 34. The back panel 18 is positioned on one side of the U-shaped structure of the seat back frame as shown in FIG. 1A. Next, the back panel 18 and seat back frame 16 are aligned with each other as shown in FIG. 1B such that the back panel 18 has a first surface 44 facing away from the seat back frame 16. As shown in FIG. 1C, the perimeter portion 30 is then wrapped around the outwardly facing surfaces 32 of the legs 42 and base 40 to be secured to a second surface 46 of the back panel 18 which faces opposite the first surface (see FIG. 2B). This allows the entirety of the seat back frame 16 to be enclosed within the back panel 18 to provide the seat back 12.

FIG. 1A shows an example of the seat back frame without any additional structures or enhancements. In another example shown in FIG. 3, the seat back frame 16 further includes a ribbed component 48 that is associated with the seat back frame 16 to increase rigidity. In one example, the ribbed component 48 comprises a plurality of structural ribs 50 that are formed on an inwardly facing surface 52 of the seat back frame 16. In one example, the seat back frame 16 has a depth D for the base 40 and legs 42. The legs 42 extend in a generally vertical direction V and the base 40 extends in a generally horizontal direction between the legs 42. Curved portions 54 of the U-shape transition between the base 40 and the legs 42.

The ribbing can be a feature (built-in) or a part (add-on). Back-Injection Molding enables the ribbing enhancing structural qualities of a given NFPP part. The ribbed component 48 is an optional structure or enhancement that is not always required; however, the ribbing is a great feature as the ribbing can be made out of PP, which is compatible material-wise with NFPP.

In one example, the structural ribs 50 include at least some ribs 50a that extend in a direction along the depth D from a forward edge 56 of the seat back frame 16 to a rearward edge 58 of the seat back frame 16. The ribs 50a form discrete ribs 50a that are spaced apart from each other along the inwardly facing surface 52 of the seat back frame 16.

In one example, the structural ribs 50 include at least some ribs 50b that extend in the vertical direction V. The ribs 50b form discrete ribs 50b that are spaced apart from each other along the inwardly facing surface 52 of the seat back frame 16.

In one example, the structural ribs 50 include at least some ribs 50c that extend in the horizontal direction H. The ribs 50c form discrete ribs 50c that are spaced apart from each other along the inwardly facing surface 52 of the seat back frame 16.

In one example, the structural ribs 50 include at least some ribs 50d that are located within the curved portions 54 of the U-shape that transition between the base 40 and the legs 42.

The subject disclosure of forming a seat back in this manner includes at least two key aspects. First, a seat back frame is made of a lightweight material such as NFPP, which due to its mechanical and environmental properties, provides a sound structural frame component while also increasing bio-friendly content. If additional structural rigidity or function integration is required, the NFPP seat back frame 16 can be back-injection molded to add structural ribs 50. Second, the CCT back panel 18 is trimmed to have a wide boarder, leaving a generous amount of unprocessed fabric, i.e. foam-free fabric, around a perimeter of the foamed CCT area. This extra fabric is then wrapped around the NFPP frame 16 to make a wrap-around back panel ready for final assembly to the seat cushion. This cuts several manufacturing steps and substantially reduces costs per part and assembly compared to existing solutions.

FIGS. 4-6D show an example of another seat component assembly that comprises a structural body 60 comprised of a natural fiber polypropylene material. In this example, the structural body 60 comprises a seat pan 62 having a first surface 64 facing in an upward direction and a second surface 66 facing opposite the first surface 64. An additional seat component comprises a ribbed structure 68 that is attached to the second surface 66 to provide structural support for the seat cushion 34 (FIG. 1D).

As shown in FIG. 5, the seat pan 62 comprises a compression mat 70 with injection molded ribs. The compression mat 70 is similar to the compression mat described above with regard to the seat back frame 16.

In one example, the compression mat 70 of the seat pan 62 includes a recessed area 72 on the first surface 64 to support a cushioning material 74 (FIG. 6B) to provide a finished seat cushion 34. In one example, the recessed area 72 is near the center and rear of the seat pan 62 to support a foam pad comprising the cushioning material 74. The seat cushion 34 and seat back 12 are assembled as described above.

In one example, the ribbed structure 68 comprises a plurality of structural ribs 76 that are spaced apart from each other and extend across the second surface 66. In one example, at least some of the plurality of the structural ribs 76a include hooked recesses 78 to interface with a seat frame 80 (FIG. 6C). The seat pan 62 has a length 82 extending in a longitudinal direction and a width 84 extending in a horizontal direction as shown in FIG. 6A. At least some ribs 76b extend in the longitudinal direction and at least some ribs 76c extend in the horizontal direction. The ribs 76b and 76c comprise discrete ribs that are spaced apart from each other in their respective directions across the bottom surface 66.

As shown in FIG. 6C, some of the ribs 76a with hooked recesses 78 engage a horizontally extending seat frame bar 86. Some of the ribs 76 with hooked recesses 78 also engage a longitudinally extending seat frame bar 88.

In one example, the seat pan 62 includes a nose 90 that is supported by the seat frame 80. In one example, the nose 90 comprises a curved body portion that curves downwardly and inwardly relative to a front edge of the seat cushion 34. In one example, the nose 90 is directly supported by a forward surface 92 of the seat frame 80. The nose 90 of the seat pan 62 is directly supported by the seat frame 80 front cross-member to prevent submarining.

In this example configuration, the subject disclosure provides a back injection molded (BIM) seat pan 62 comprised of a NFPP material. The use of NFPP provides several advantages. It is lightweight, is formed through pressing, which is less energy intensive than stamping or injection processes, and is at least partially bio-sourced. Additionally, the BIM of polypropylene ribs 76 allows for structural reinforcement and function integration while maintaining the mono-material nature of the part as being recycling friendly. This results in less weight, decreased costs, and less energy-intensive assembly methods and processes.

The subject disclosure also provides a method of forming a structural body 14, 60 comprised of a natural fiber polypropylene material, and attaching an additional seat component 18, 68 to the structural body 14, 60 to provide a seat back 12 or a seat cushion 34. In one example, the method includes forming the structural body 14, 60 as a compression mat. In one example, the structural body comprises a seat back frame 16, and the additional seat component comprises a cover carving back panel 18 comprised of a foam layer 28 and a cover material 24, where the cover carving back panel 18 is attached to the seat back frame 16 to provide the seat back 12. In another example, the structural body comprises a seat pan 62 and the additional seat component comprises a ribbed structure 68 attached to the second surface 66 of the seat pan 62 to provide structural support for the seat cushion 34.

In one example, the method further includes forming the structural body 14, 60 from NFPP that is shaped by compression molding to form a compression mat.

When the structural body comprises the seat back frame 16, additional steps can include, either alone or in combination, spraying the foam layer 28 onto a layer 26 of the cover material 24 such that a perimeter portion 30 of the cover material 24 is free from the foam material 22, pressing the foam layer 28 and covering material layer 26 to form the cover carving back panel 18, wrapping the perimeter portion 30 of the layer 26 of cover material 24 around sides of the seat back frame 16, and attaching the cover carving back panel 18 to the seat back frame 16 to form the seat back 12.

When the structural body comprises the seat pan 62, additional steps can include, either alone or in combination, molding the ribbed component 68 to the second side 66 of the seat pan 62, forming a recessed area 72 on the first side 64 of the seat pan 62 to support a cushioning material 74, forming at least some ribs of the ribbed component to include hooked recesses 78, and hooking the hooked recesses 78 onto a seat frame 80 that supports the seat pan 62.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method comprising:
   forming a structural body comprised of a natural fiber polypropylene material; and
   attaching an additional seat component to the structural body to provide a seat back or a seat cushion,
   forming the structural body as a compression mat, and wherein the structural body comprises: a seat back frame, and wherein the additional seat component comprises a back panel comprised of a foam layer and a cover material, and including attaching the back panel to the seat back frame to provide the seat back, or a seat pan having a first surface facing in an upward direction and a second surface facing opposite the first surface, and wherein the additional seat component comprises a ribbed structure attached to the second surface to provide structural support for the seat cushion, and
   wherein: the structural body comprises the seat pan, and the method further includes:
   molding the ribbed component to the second side of the seat pan,
   forming a recessed area on the first side of the seat pan to support a cushioning material,
   forming at least some ribs of the ribbed component to include hooked recesses, and
   hooking the hooked recesses onto a seat frame that supports the seat pan.

2. The method according to claim 1, wherein:
   the structural body comprises the seat back frame, and including
   spraying the foam layer onto a layer of the cover material such that a perimeter portion of the cover material is free from the foam layer, and
   pressing the foam layer and covering material layer to form the back panel,
   wrapping the perimeter portion of the layer of cover material around sides of the seat back frame, and
   attaching the back panel to the seat back frame to form the seat back.

* * * * *